US012492687B2

(12) United States Patent
Sale et al.

(10) Patent No.: US 12,492,687 B2
(45) Date of Patent: Dec. 9, 2025

(54) INSERT AND METHOD FOR MANUFACTURING FLUID PUMP

(71) Applicant: Caterpillar Inc., Peoria, IL (US)

(72) Inventors: Ron L. Sale, Mapleton, IL (US); Curtis J. Graham, Peoria, IL (US); Luis A. Vazquez, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 18/454,596

(22) Filed: Aug. 23, 2023

(65) Prior Publication Data

US 2025/0067255 A1 Feb. 27, 2025

(51) Int. Cl.
F04B 1/2035 (2020.01)
B23P 6/02 (2006.01)
F01B 3/00 (2006.01)
F03C 1/06 (2006.01)

(52) U.S. Cl.
CPC ............. F04B 1/2035 (2013.01); B23P 6/02 (2013.01); F01B 3/0052 (2013.01); F03C 1/0636 (2013.01)

(58) Field of Classification Search
CPC ...... F04B 1/20; F04B 1/2035; F04B 27/0804; F04B 27/0834; F01B 3/0052; F03C 1/0636
See application file for complete search history.

(56) References Cited

U.S. PATENT DOCUMENTS

| | | | |
|---|---|---|---|
| 4,486,938 A | 12/1984 | Hext | |
| 5,941,159 A * | 8/1999 | Hansell | F04B 1/2085 91/499 |
| 6,240,661 B1 | 6/2001 | Seibold | |
| 10,677,240 B2 | 6/2020 | Graham et al. | |
| 2011/0179947 A1 | 7/2011 | Awwad et al. | |
| 2016/0131116 A1 | 5/2016 | Friedrichsen et al. | |
| 2017/0050274 A1 | 2/2017 | Corn et al. | |

FOREIGN PATENT DOCUMENTS

CN 206563039 U 10/2017
CN 109514171 A 3/2019

OTHER PUBLICATIONS

Written Opinion and International Search Report for Int'l. Patent Appln. No. PCT/US2024/038650, mailed Sep. 16, 2024 (31 pgs).

* cited by examiner

Primary Examiner — Kenneth J Hansen

(57) ABSTRACT

A cylinder block for a fluid pump includes a cylindrical body having a hub bore and a plurality of cylinder bores arranged about the hub bore, a hub insert disposed in the hub bore, and an anti-rotation body configured to prevent rotation of the hub insert relative to the cylindrical body. The cylindrical body and the hub insert together define a channel in which the anti-rotation body is inserted.

15 Claims, 4 Drawing Sheets

INSERT AND METHOD FOR MANUFACTURING FLUID PUMP

TECHNICAL FIELD

The present disclosure relates generally to fluid pumps, and, more particularly, to an insert for initial manufacturing or remanufacturing a cylinder block of a fluid pump. The present disclosure further relates to an original or to a remanufactured cylinder block for a fluid pump and to a method for manufacturing or remanufacturing a cylinder block of a fluid pump.

BACKGROUND

Fluid pumps are used in a variety of applications to convey and/or pressurize fluids of various types. While various forms of fluid pumps are well-known, many operate by converting rotational input from a motor, engine, or other power source into fluid displacement. One specific type of fluid pump, known as an axial piston pump, utilizes a rotating cylinder block to actuate pistons for displacing fluid. The cylinder block is rotated by a shaft, with this rotation imparting significant stress to the connection interface between the cylinder block and shaft. Conventionally, failure at this connection interface was addressed by replacing the cylinder block in its entirety. However, the remainder of the cylinder block, other than the connection interface to the shaft, often does not incur wear to an extent that warrants replacement.

U.S. Patent Application Publication No. 2011/0179947 to Awwad ("the '947 publication") describes a method for remanufacturing a pump barrel of a hydraulic pump. In particular, the '947 publication discloses a method for replacing the internal splines of pump barrel by machining away the damaged splines of the pump barrel, threading the resultant opening, and inserting a spline insert having a complementary thread into the threaded opening. While the method described in the '947 publication is useful in some circumstances, it uses threading to maintain the spline insert in the desired location with respect to the pump barrel, rather than an anti-rotation body to prevent rotation of the insert relative to the pump barrel.

The devices, systems, and methods of the present disclosure may improve upon aspects of the '947 publication and/or address other problems in the art. The scope of the current disclosure, however, is defined by the attached claims, and not by the ability to solve any specific problem.

SUMMARY

In one aspect, the present disclosure is directed to a cylinder block for a fluid pump. The cylinder block includes a cylindrical body having a hub bore and a plurality of cylinder bores arranged about the hub bore, a hub insert disposed in the hub bore, and an anti-rotation body configured to prevent rotation of the hub insert relative to the cylindrical body. The cylindrical body and the hub insert together define a channel in which the anti-rotation body is inserted.

In another aspect, the present disclosure is directed to a hub insert for repair or remanufacture of a cylinder block of a fluid pump. The hub insert includes a cylindrical body defining a shaft bore having at least one internal spline, a plurality of channels defined in the cylindrical body and extending parallel to the shaft bore, and a plurality of anti-rotation bodies configured to be inserted respectively into the plurality of channels.

In another aspect, the present disclosure is directed a method for remanufacturing a cylinder block of a fluid pump. The method includes forming a hub bore in the cylinder block by removing a hub section of the cylinder block, disposing a hub insert in the hub bore, forming a channel in the hub insert and a cylindrical body of the cylinder block, and inserting an anti-rotation body into the channel to prohibit rotation of the hub insert relative to the cylinder block.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
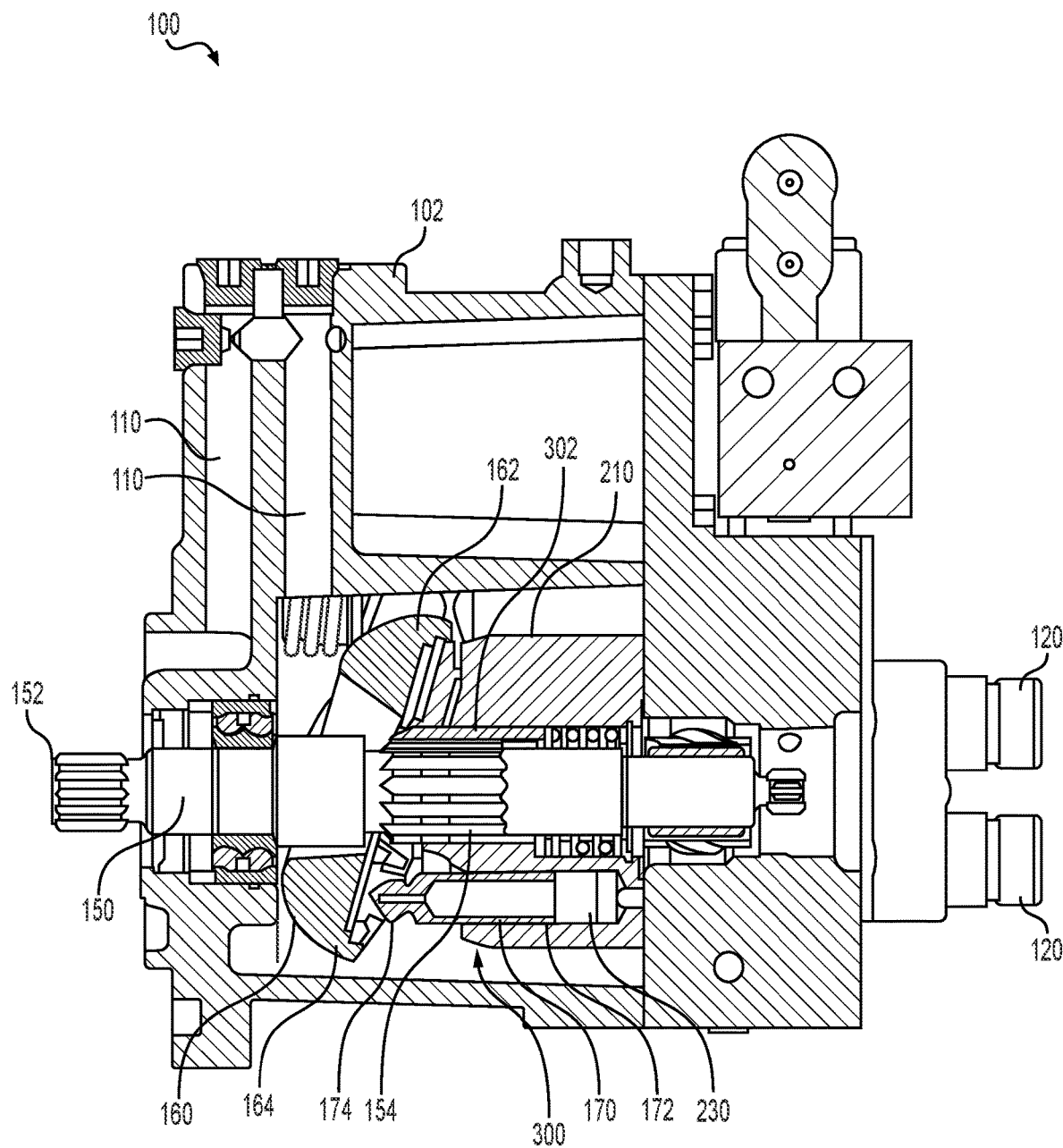
FIG. 1 is a cross-sectional side view of a fluid pump, according to aspects of the disclosure.

FIG. 1 shows a cross-sectional side view of a fluid pump 100. Fluid pump 100 may be an axial piston pump of the type used in various applications, such as a pump for a hydraulic electronic unit injection (HEUI) engine fuel system. Pump 100 includes a housing 102 having one or more inlet ports 110 and one or more outlet ports 120. Fluid (e.g., hydraulic fluid) is supplied to pump 100 from inlet port(s) 110 and exits pump 100 under pressure from outlet port(s) 120. A shaft 150 extends within housing 102, and may include a driven end 152 extending outside of housing 102 for connection to a power source (not shown), such as a drive pulley, drive gear, motor, etc. A cylinder block is coupled to shaft 150 within housing 102. In FIG. 1, the cylinder block depicted is a remanufactured cylinder block 300, according to aspects of the present disclosure, although pump 100 may instead include an original (non-remanufactured) cylinder block 200, as described herein in connection with FIG. 2. Shaft 150 may include one or more external spline(s) 154 (or other locking features) that engage corresponding internal spline(s) 322 (see FIG. 3) of remanufactured cylinder block 300 to rotationally lock remanufactured cylinder block 300 to shaft 150.

Remanufactured cylinder block 300 includes a plurality of cylinder bores 230 (best shown in FIG. 3) that each receive a piston 170. A first end 172 of each piston 170 is inserted into the corresponding cylinder bore 230, and a second end 174 of each piston 170 extends out of the corresponding cylinder bore 230.

A yoke 160 is operatively engaged with second end 174 of each piston 170. Yoke 160 is arranged at an angle with respect to shaft 150, such that a top section 162 of yoke 160 is arranged closer to remanufactured cylinder block 300 than a bottom section 164 of yoke 160.

As noted above, pump 100 illustrated in FIG. 1 includes remanufactured cylinder block 300 according to aspects of the present disclosure. Remanufactured cylinder block 300 may replace original cylinder block 200, shown in FIG. 2, after original cylinder block 200 has been removed (e.g., due to damage and/or wear). Generally, remanufactured cylinder block 300 and original cylinder block 200 are functionally equivalent and interchangeable within pump 100. However, in at least some aspects, the "remanufactured" cylinder block 300 may be used as an original component of pump 100. Therefore, the discussion of remanufacturing herein is understood to be applicable to original manufacturing, if desired.

Figure 2:
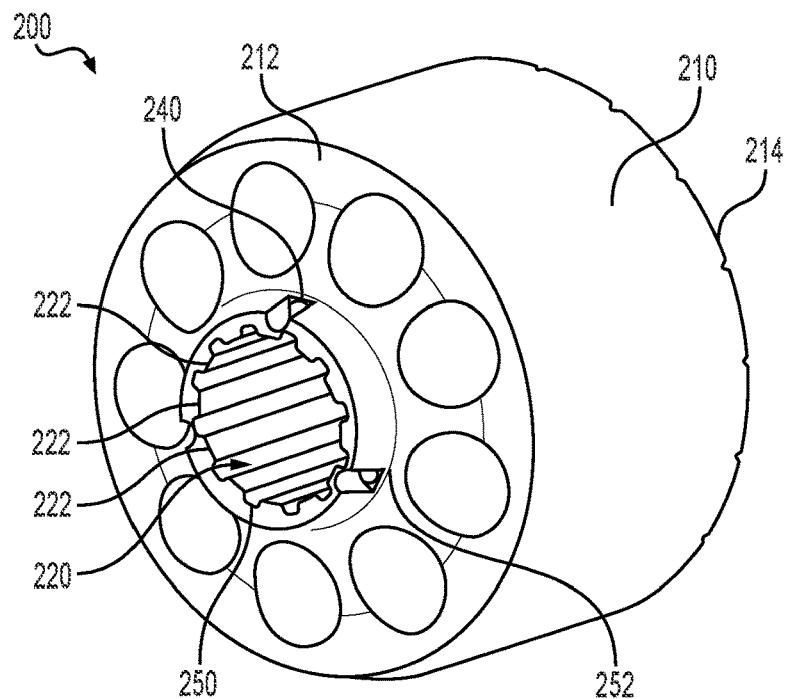
FIG. 2 is a perspective view of an original cylinder block for use in the pump of FIG. 1.

Referring now to FIG. 2, original cylinder block 200 includes a generally cylindrical body 210 having a proximal end 212 and a distal end 214. A shaft bore 220 extends centrally through cylindrical body 210 from proximal end 212 to distal end 214. A portion or an entirety of shaft bore 220 includes at least one internal spline 222 or other feature (e.g., a keyway) to rotationally lock cylindrical body 210 to external spline(s) 154 of shaft 150 of pump 100 (see FIG. 1). In some aspects, internal spline(s) 222 extends through proximal end 212 and terminates between proximal end 212 and distal end 214.

Figure 4:
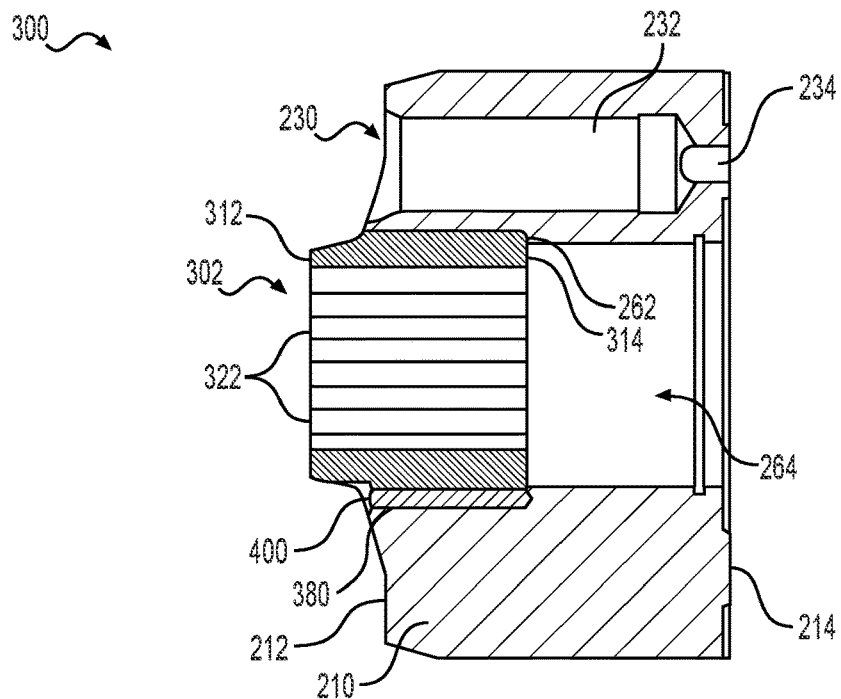
FIG. 4 is a cross-sectional side view of the remanufactured cylinder block of FIG. 3.

The plurality of cylinder bores 230 are arranged about shaft bore 220. Cylinder bores 230 may be evenly spaced about shaft bore 220. As best shown in FIG. 4, cylinder bores 230 include a main portion 232 that extends partially through cylindrical body 210 in which a respective piston 170 (see FIG. 1) is disposed. Cylinder bores 230 further include a reduced portion 234 having a lesser cross sectional area than main portion 232. Reduced portion 234 extends from a terminal end of main portion 232 through distal end 214 of cylindrical body 210.

Original cylinder block 200 further includes recesses 240 arranged concentrically about shaft bore 220. Recesses 240 may index cylinder block 200 relative to other features of pump 100.

Cylindrical body 210 and all features included therein (e.g., shaft bore 220, internal splines 222, cylinder bores 230, and recesses 240) may be formed from a single, monolithic piece of material. As shown in FIG. 2, a hub section 250 of cylindrical body 210 may be defined concentrically about shaft bore 220, and includes a portion of cylindrical body 210 contained within demarking line 252. Note that demarking line 252 is shown in FIG. 2 only for the purpose of illustrating the extent of hub section 250, and may not be an actual physical feature of cylindrical body 210. Demarking line 252 is generally located between shaft bore 220 and cylinder bores 230. As such, hub section 250 includes internal spline(s) 222 and, in some aspects, recesses 240. During use of pump, internal spline(s) 222 may experience wear and/or damage that can eventually reduce the ability of internal spline(s) 222 to remain coupled to external spline(s) 154 of shaft 150 (see FIG. 1). Hub section 250 of cylindrical body 210 may be removed during a remanufacturing process (see FIG. 6) to replace worn or damaged internal spline(s) 222.

Figure 3:
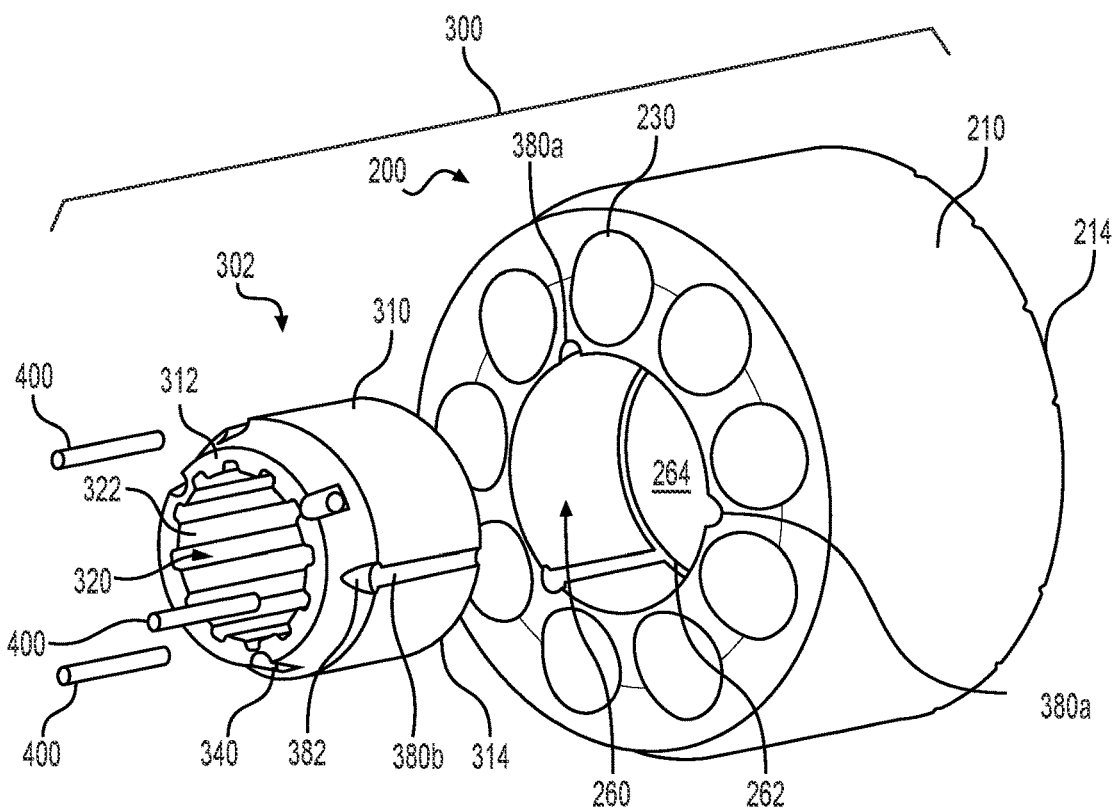
FIG. 3 is an exploded perspective view of a remanufactured cylinder block for use in the pump of FIG. 1.
Figure 5:
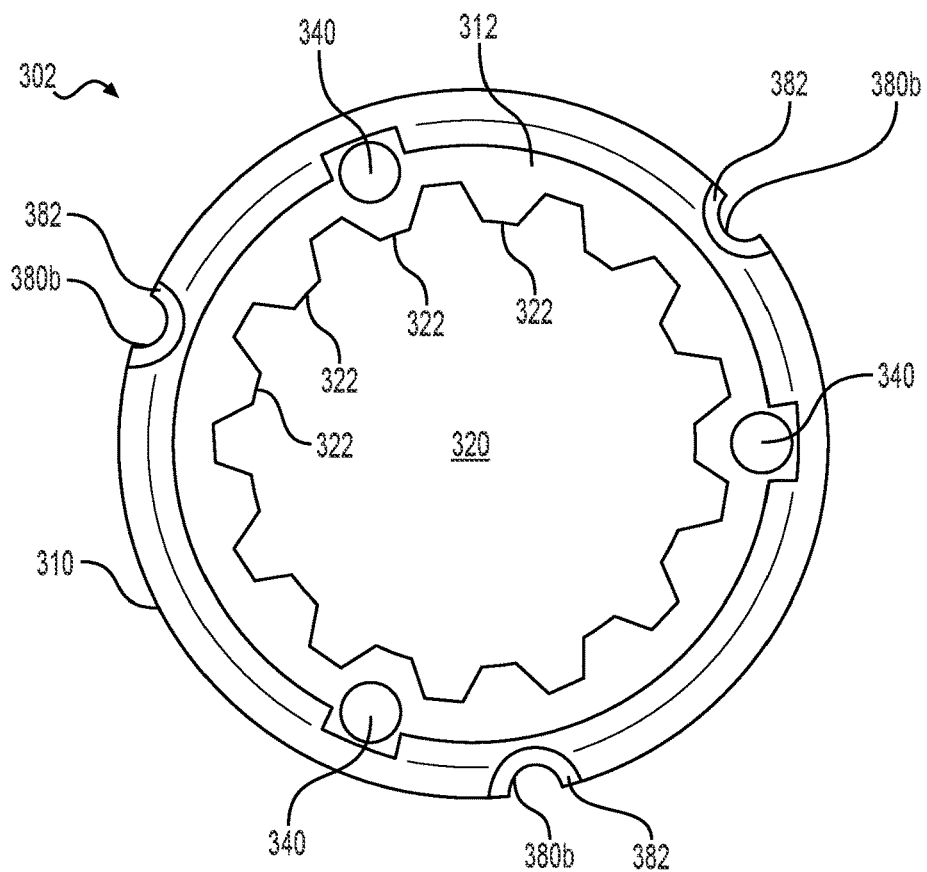
FIG. 5 is a front view of the remanufactured cylinder block of FIG. 3.

Referring now to FIGS. 3-5, remanufactured cylinder block 300 is formed by removing hub section 250 (see FIG. 2) from original cylinder block 200, and inserting a hub insert 302 in place of hub section 250. Removal of hub section 250 leaves a hub bore 260 centrally located in cylindrical body 210. Hub bore 260 may extend from proximal end 212 of cylindrical body 210 at least partially through cylindrical body 210, stopping short of distal end 214. In some aspects, hub bore 260 terminates within cylindrical body 210 to form a shoulder 262. A distal bore 264, which has a smaller diameter than hub bore 260, extends distally from shoulder 262 to distal face 214 of cylindrical body 210.

Hub insert 302 includes a generally cylindrical body 310 having a proximal end 312 and a distal end 314. A shaft bore 320 extends centrally through cylindrical body 310 from proximal end 312 to distal end 314. At least a portion of shaft bore 320 includes at least one internal spline 322 or other feature (e.g., keyway) to rotationally lock cylindrical body 310 to shaft 150 of pump 100 (see FIG. 1) in the same manner as internal spline(s) 222 (or a keyway) of original cylinder block 200. In some aspects, internal spline(s) 322 extend through cylindrical body 310 from proximal end 312 to distal end 314. Shaft bore 320 and internal spline(s) 322 of hub insert 302 correspond to shaft bore 220 and internal spline(s) 222 of original cylinder block 200 (see FIG. 2). As such, shaft bore 320 and internal spline(s) 322 of hub insert 302 may have the same operative dimensions (e.g., major diameter, minor diameter, spline profile, etc.) as shaft bore 220 and internal spline(s) 222 of original cylinder block 200. As such, remanufactured cylinder block 300 fits onto shaft 150 of pump 100 in substantially the same manner as original cylinder block 200 (excluding any wear/damage to splines 222).

An outer diameter of cylindrical body 310 of hub insert 302 may be slightly larger than an inner diameter of hub bore 260, such that hub insert 302 has an interference fit with hub bore 260. Hub insert 302 is inserted into hub bore 260 to a depth at which distal end 314 of cylindrical body 310 engages shoulder 262 at the terminal end of hub bore 260, which axially locates hub insert 302 with respect to cylindrical body 210 (see FIG. 4). In some aspects, proximal end 312 of hub insert 302 extends beyond proximal end 212 of cylindrical body 210 when distal end 314 of hub insert 302 is seated against shoulder 262.

The interference fit between hub insert 302 and hub bore 260 of cylindrical body 210 may be sufficient to prevent rotation of hub insert 302 relative to original cylinder block 200 under normal operating loads of pump 100. To provide additional resistance to rotation, an anti-rotation body 400 may be disposed radially between hub insert 302 and hub bore 260. In some aspects, at least one of hub insert 302 and/or cylindrical bore 210 defines a channel 380 (FIG. 4) for receiving anti-rotation body 400. Channel 380 may be composed of a first partial channel 380a formed in cylindrical body 210 and a second partial channel 380b formed in cylindrical body 310 of hub insert 302. First partial channel 380a and second partial channel 380b extend parallel to shaft bore 320 and hub bore 260. With hub insert 302 seated in hub bore 260 of cylindrical body 210, first partial channel 380a of cylindrical body 210 aligns with second partial channel 380b of hub insert 302. Channel 380 may be located in hub insert 302 and cylindrical body 210 to set the rotational position of hub insert 302 relative to cylindrical body 210. In particular, first partial channel 380a and second partial channel 380b may be located so as to index internal spline(s) 322 and/or recesses 340 of hub insert 302 in a desired orientation with respect to cylinder bores 230 of cylindrical body 210.

First partial channel 380a may terminate within cylindrical body 210; for example, first partial channel 380a may extend from proximal end 212 of cylindrical body 210 to shoulder 262 of hub bore 260. In some aspects, second partial channel 380b extends the entire length of cylindrical body 310 of hub insert 302 from proximal end 312 to distal end 314. Channel 380 may include a counterbore 382 extending into proximal end 212 of cylindrical body 210 and/or proximal end 312 of cylindrical body 310. Counterbore 382 may serve as a guide for inserting anti-rotation body 400 into channel 380.

In some aspects, anti-rotation body 400 may be a pin having a cylindrical shank extending parallel to hub bore 260, and channel 380 may be a cylindrical bore with a circular cross-section sized to receive the cylindrical shank. In particular, each of first partial channel 380a and second partial channel 380b may be semi-circular in shape (i.e. defining approximately half of a circle) so that channel 380 defines a circular bore. Anti-rotation body 400 may have an interference fit with channel 380 to lock anti-rotation body 400 in place axially. In other aspects, anti-rotation body 400 may be a key, e.g., a square key, rectangular key, woodruff key, tapered gib key, or the like, and channel 380 may have a corresponding shape for receiving and retaining anti-rotation body 400.

In some aspects, channel 380 may be located substantially equidistant between two adjacent cylinder bores 230 of cylindrical body 210 about a circumference of the hub bore 260 to minimize or eliminate strength reduction of cylindrical body 210 that may otherwise be associated with removal of material to form first partial channel 380a. Cylindrical body 210 has the most material between cylinder bores 230, so removal of material from between cylinder bores 230 to form first partial channel 380a has a negligible, if any, impact on the overall strength of cylindrical body 210. Similarly, second partial channel 380b of hub insert 302 may be formed between recesses 340 in a circumferential direction of body 310, rather than directly adjacent recesses 340, so that removal of material to form second partial channel 380b has negligible, if any, impact on the overall strength of hub insert 302.

In some aspects, as shown in FIGS. 3-5, remanufactured cylinder block 300 includes three anti-rotation bodies 400 spaced equally about the circumference of hub insert 302, and three corresponding channels 380 are provided in hub insert 302 and/or cylindrical body 210. However, any number of anti-rotation bodies 400 and corresponding channels 380 may be provided, such as one, two, four, five, etc. Additionally, anti-rotation bodies 400 and channels 380 may be distributed at changing intervals along the circumference of hub insert 302, if desired.

Internal spline(s) 322 and recess(es) 340 of hub insert 302 may be structurally and/or functionally equivalent to internal spline(s) 222 and recess(es) 240 of original cylinder block 200 prior to removal of hub section 250 (see FIG. 2). That is, internal spline(s) 322 of hub insert 302 may have the same profile as internal spline(s) 222 of an undamaged/unworn original cylinder block 200. Internal spline(s) 322 of hub insert 302 may transfer torque from shaft 150 of pump 100 (see FIG. 1) to cylindrical body 210 in the same manner that internal spline(s) 222 of an undamaged/unworn original cylinder block 200. Similarly, recess(es) 340 of hub insert 302 may have the same profile as recess(es) 240 of an undamaged/unworn original cylinder block 200.

In some aspects, hub insert 302 may be made from the same material (e.g., the same alloy of steel) as original cylinder block 200 so that cylindrical body 210 and cylindrical body 310 have substantially the same structure properties (e.g., strength, hardness, etc.) and thermal expansion rates. In other aspects, hub insert 302 may be made from a different material than cylindrical body 210, such a harder material, so that internal spline(s) 322 of hub insert 302 are more wear resistant than internal spline(s) 222 of original cylinder block 200.

INDUSTRIAL APPLICABILITY

Pump 100 of the present disclosure may be utilized to convey fluid in a variety of different applications. For example, pump 100 may be used in an engine of a mobile vehicle, mobile machine, or stationary machine to supply hydraulic fluid to an engine fuel system such as a hydraulic electronic unit injection (HEUI) engine fuel system. With reference to FIG. 1, fluid (e.g., hydraulic fluid) is supplied to inlet port(s) 110 of pump 100 from an external source, such as a fluid tank (not shown). Driven end 152 of shaft 150 is rotated by a power source (e.g., a drive pulley, drive gear, motor, etc.) which in turn rotates the cylinder block (either original cylinder block 200 or remanufactured cylinder block 300). As cylinder block 200, 300 rotates, pistons 170 reciprocate to pressurize and pump fluid to outlet port(s) 120.

Specifically, each piston 170 reciprocates between a most extended state (shown in FIG. 1), in which second end 174 of piston 170 is pulled farthest away from cylinder block 200, 300, and a most retracted state in which second end 174 of piston 170 is nearest cylinder block 200, 300. Piston 170 may be located adjacent bottom section 164 of cylinder block 200, 300 at a start of a pump cycle, as shown in FIG. 1. In this position, piston 170 is in the most extended position, as second end 174 engages bottom section 164 of yoke 160. In this position, fluid is drawn into cylinder bore 230 from inlet port(s) 110. As cylinder block 200, 300 rotates, piston 170 revolves about the axis of shaft 150 and thus moves away from bottom section 164 of yoke 160 towards top section 162 of yoke 160. In so doing, piston 170 is forced deeper into cylinder bore 230 by yoke 160. That is, second end 174 of piston engages a portion of yoke 160 nearer to cylinder block 200, 300 than bottom section 164 of yoke 160, which forces second end 174 of piston 170 toward cylinder block 200, 300. As piston 170 is forced toward cylinder block 200, 300 and thus into cylinder bore 230, the fluid in cylinder bore 230 is pressurized and forced out of reduced portion 234 (see FIG. 4) to outlet port(s) 120. As cylinder block 200, 300 continues to rotate, piston 170 eventually reaches a position adjacent top section 162 of yoke 160, at which point piston is in the most retracted state (i.e. at its deepest in cylinder bore 230). In this position, piston 170 has completed the pressurization stage of the pump cycle. As cylinder block 200, 300 continues to rotate, piston 170 moves back toward bottom section 164 of yoke 160. Engagement of second end 174 of piston 170 to yoke 160 pulls second end 174 away from cylinder block 200, 300, which causes fluid to be drawn into cylinder bore 230 from inlet port(s) 120. When piston 170 reaches bottom section 164 of yoke 160 (as shown in FIG. 1), the pump cycle repeats.

Yoke 160 may be pivotally mounted within pump 100 such that the angle of yoke 160 with respect to shaft 150 may be adjusted to control the distance that pistons 170 reciprocate. Adjustment of the angle of yoke 160 changes the distance between top section 162 of yoke 160 and cylinder block 200, 300, and the distance between bottom section 164 of cylinder block 200, 300. Such adjustment change the distance between the most extended and most retracted states of pistons 170, and thus the fluid displacement of pump 100. By increasing the angle of yoke 160 with respect to shaft 150, the stroke of pistons 170 is shortened, and the fluid displacement is reduced. Conversely, by decreasing the angle of yoke 160 with respect to shaft 150, the stroke of pistons 170 is lengthened, and the fluid displacement is increased.

During operation of pump 100, internal spline(s) 222 of original cylinder block 200 may experience wear and/or damage as torque is transferred from shaft 150 to cylinder block 200. Wear and/or damage to internal spline(s) 222 conventionally requires replacement of cylinder block 200 even when the other operative features (e.g., cylinder bores 230) remain in useable conditional. As an alternative to replacement, original cylinder block 200 may be remanufactured to repair/replace worn and/or damaged internal spline(s) 222, as described below.

Figure 6:
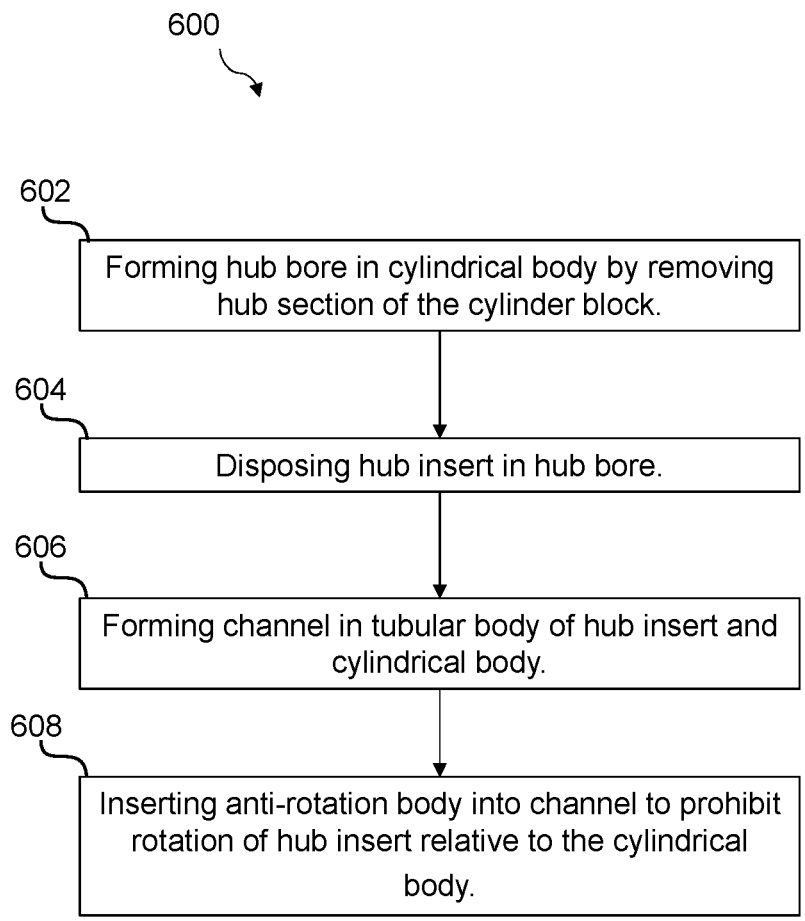
FIG. 6 is a flowchart depicting an exemplary method for manufacturing or remanufacturing a cylinder block of a fluid pump, according to aspects of the disclosure.

FIG. 6 includes a flowchart for an exemplary method 600 for remanufacturing original cylinder block 200 to form remanufactured cylinder block 300. Method 600 includes, at step 602, forming hub bore 260 in cylindrical body 210 by removing hub section 250 of the cylinder block 200 (see FIG. 2). As hub section 250 includes internal spline(s) 222, removal of hub section 250 results in removal of any worn and/or damaged internal spline(s) 222. In some aspects, recesses 240 are also included in hub section 250, so removal of hub section 250 further results in removal of recesses 240. Hub section 250 may be removed by any suitable method and machinery, such as boring on a lathe or milling on a milling machine.

Method 600 further includes, at step 604, disposing hub insert 302 in hub bore 260 (see FIGS. 3-5). As noted above, hub insert 302 may form an interference fit with hub bore 260, and may require a machine to exert sufficient force to seat hub insert 302 into hub bore 260. Alternatively or additionally, hub insert 302 may be cooled to shrink hub insert 302 and temporarily reduce the interference fit for assembly. Alternatively or additionally, cylindrical body 210 may be heated to temporarily expand hub bore 260 to reduce the interference fit for assembly. Hub insert 302 is inserted into hub bore 260 until distal end 314 of hub insert 302 engages shoulder 262 of hub bore 260. In some aspects, hub insert 302 is rotationally indexed relative to hub bore 260 such that internal spline(s) 322 and/or recesses 340 of hub insert 302 are indexed at a desired position with respect to cylinder bores 230 (see FIGS. 3 and 4).

Method 600 further includes, at step 606, forming one or more channels 380 in cylindrical body 310 of hub insert 302 and cylindrical body 210 (see FIGS. 3-5). Forming each channel 380 includes forming both first partial channel 380a in cylindrical body 210 and second partial channel 380b in cylindrical body 310. In some aspects, step 606 is performed after step 604, with first partial channel 380a and second partial channel 380b being formed as part of the same operation. For example, channel 380 may be formed by drilling and/or reaming a channel 380 into hub insert 302 and cylindrical body 210, simultaneously forming first partial channel 380a and second partial channel 380b.

In other aspects, step 606 is performed prior to step 604, with first partial channel 380a and second partial channel 380b being formed independently in hub insert 302 and cylindrical body 210, respectively. In such aspects, first partial channel 380a and second partial channel 380b are rotationally aligned when hub insert 302 is disposed in hub bore 260 (at step 604), such that the combination of first partial channel 380a and second partial channel 380b form channel 380. Each of first partial channel 380a and second partial channel 380b may be formed using any suitable machining operation such as milling, drilling, reaming, broaching, etc.

In some aspects, step 606 may be partially performed before step 604, and partially performed after step 604. For example, each of first partial channel 380a and second partial channel 380b may be partly formed independently, before hub insert 302 is disposed in hub bore 260 (at step 604). The remainder of first partial channel 380a and second partial channel 380b may be formed simultaneously, after hub insert 302 is disposed in hub bore 260 (at step 604), to complete channel 380. The partly-formed first partial channel 380a and partly-formed second partial channel 380b, when aligned after insertion of hub insert 302 into hub bore 260, may serve as a pilot hole to guide a finish machining process, such as drilling or reaming, to complete formation of channel 380. Stated another way, first partial channel 380a and second partial channel 380b may be formed undersized prior to disposing hub insert 302 into hub bore 260 (step 604), and undersized partial channels 380a, 380b may together form a pilot hole for a drilling and/or reaming operation to complete channel 380 after hub insert 302 is disposed in hub bore 260 (step 604).

In some aspects, counterbore 382 of channel 380 may be formed prior to disposing hub insert 302 into hub bore 260 (step 604). In particular, a portion of counterbore 382 may be formed in cylindrical body 310, and a complementary portion of counterbore 382 may be separately formed in cylindrical body 210. After hub insert 302 is disposed in hub bore 260 (step 604), counterbore 382 may be used as a guide for a drilling and/or reaming operation to from the remainder of channel 380.

Method 600 further includes, at step 608, inserting anti-rotation body 400 into channel 380 to prohibit rotation of hub insert 302 relative to the cylindrical body 210 (see FIGS. 3 and 4). In some aspects, anti-rotation body 400 may have an interference fit with channel 380, and may require a machine to exert sufficient force to seat anti-rotation body 400 into channel 380. Alternatively or additionally, anti-rotation body 400 may be cooled to shrink anti-rotation body 400 and temporarily reduce the interference fit for assembly. Alternatively or additionally, cylindrical body 210 and hub insert 302 may be heated to temporarily expand channel 380 to reduce the interference fit for assembly.

In some aspects, method 600 may further include forming internal spline(s) 322 in hub insert 302 (see FIGS. 3-5). Formation of internal spline(s) 322 may be performed using any suitable machining operation, such as broaching. In some aspects, formation of internal spline(s) 322 may be performed prior to disposing hub insert 302 into hub bore 260 (step 604). In other aspects, formation of internal spline(s) 322 may be performed after disposing hub insert 302 into hub bore 260 (step 604). By forming internal spline(s) 322 after disposing hub insert 302 into hub bore 260, internal spline(s) 322 can be machined at a desired rotationally-indexed position relative to cylinder bores 230, recesses 340, and/or other features of cylindrical body 210.

While method 600 describes remanufacturing or original cylinder block 200 to repair damage to internal spline(s), the resultant remanufactured cylinder block 300 may itself be amenable to further remanufacturing if internal spline(s) 322 become worn and/or damaged. In particular, hub insert 302 having the worn and/or damaged internal spline(s) 322 may be removed from hub bore 260 and replaced with a new hub insert 302.

The present disclosure provides components and methods for remanufacturing of cylinder block 200 of fluid pump 100. This allows significant portions of cylinder block 200 to be reused even after certain elements, namely internal spline(s) 222, have been damaged or worn to the degree that repair is necessary. Remanufacturing cylinder block 200 in accordance with aspects the present disclosure may have advantages over replacing cylinder block 200 in its entirety. For example, remanufacturing cylinder block 200 is economical as substantial portions of cylinder block 200, namely cylindrical body 210 and cylinder bores 230, often do not experience wear and/or damage to the same degree as internal spline(s) 222. Further, the practice of replacing cylinder block 200 in its entirety results in discarding these components of cylinder block well before the end of their useful life. In contrast, remanufacturing of cylinder block 200 as described herein (e.g., in method 600) removes only hub section 250 of cylinder block 200 while taking advantage of the relatively longer life expectancy cylindrical body 210, cylinder bores 230, and associated elements. Moreover, hub insert 302 may be made of a harder and/or more wear-resistant material than cylindrical body 210 to increase the life of remanufactured block cylinder 300.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A cylinder block for a fluid pump, the cylinder block comprising:
    a cylindrical body having a hub bore and a plurality of cylinder bores arranged about the hub bore;
    a hub insert disposed in the hub bore, the hub insert comprising a shaft bore having internal splines; and
    an anti-rotation body configured to prevent rotation of the hub insert relative to the cylindrical body,
    wherein the cylindrical body and the hub insert together define a channel in which the anti-rotation body is inserted.

2. The cylinder block of claim 1, wherein the anti-rotation body comprises a pin extending parallel to the hub bore, and
    wherein the channel comprises a circular bore for receiving the pin, the circular bore having a first partial channel defined in the cylindrical body and a second partial channel defined in the hub insert.

3. The cylinder block of claim 1, wherein the hub insert comprises a generally cylindrical hub body.

4. The cylinder block of claim 1, wherein the hub bore defines a shoulder within the cylindrical body, and
    wherein the hub insert engages the shoulder to axially locate the hub insert in the hub bore.

5. The cylinder block of claim 1, wherein the hub insert forms an interference fit with the hub bore.

6. The cylinder block of claim 1, where in the channel comprises a counterbore extending into a proximal end of the cylindrical body and a proximal end of the hub insert.

7. The cylinder block of claim 1, wherein the anti-rotation body is located substantially equidistant between two cylinder bores as measured along a circumference of the hub bore.

8. The cylinder block of claim 1, wherein the channel is one of a plurality of channels equally spaced along the hub insert; and
    wherein the anti-rotation body is one of a plurality of anti-rotation bodies respectively inserted into the plurality of channels.

9. The cylinder block of claim 1, wherein the hub insert comprises at least one recess extending into a proximal end of the hub insert.

10. The cylinder block of claim 1, wherein a proximal end of the hub insert extends beyond a proximal end of the cylindrical body.

11. A cylinder block for a fluid pump, the cylinder block comprising:
    a cylindrical body having a hub bore and a plurality of cylinder bores arranged about the hub bore;
    a hub insert disposed in the hub bore and configured to receive a shaft; and
    an anti-rotation body configured to prevent rotation of the hub insert relative to the cylindrical body,
    wherein the cylindrical body and the hub insert together define a channel between a radially outer surface of the hub insert and a radially inner surface of the cylindrical body in which the anti-rotation body is inserted.

12. The cylinder block of claim 11, wherein the hub bore defines a shoulder within the cylindrical body, and
    wherein the hub insert engages the shoulder to axially locate the hub insert in the hub bore.

13. The cylinder block of claim 11, wherein the hub insert forms an interference fit with the hub bore.

14. The cylinder block of claim 11, wherein the channel comprises a counterbore extending into a proximal end of the cylindrical body and a proximal end of the hub insert.

15. The cylinder block of claim 11, wherein the channel is one of a plurality of channels equally spaced along the hub insert; and
    wherein the anti-rotation body is one of a plurality of anti-rotation bodies respectively inserted into the plurality of channels.

* * * * *